US012809686B2

(12) United States Patent
Herb et al.

(10) Patent No.: US 12,809,686 B2
(45) Date of Patent: Nov. 24, 2026

(54) REDUCING THE ENVIRONMENTAL IMPACT OF DISTRIBUTED COMPUTING

(71) Applicant: Vapor IO Inc., Austin, TX (US)

(72) Inventors: Daniel Herb, Austin, TX (US); Colton M. Crawford, Austin, TX (US)

(73) Assignee: Vapor IO Inc., Austin, TX (US)

( * ) Notice: Subject to any disclaimer, the term of this patent is extended or adjusted under 35 U.S.C. 154(b) by 1080 days.

(21) Appl. No.: 17/863,264

(22) Filed: Jul. 12, 2022

(65) Prior Publication Data

US 2023/0017632 A1 Jan. 19, 2023

Related U.S. Application Data

(60) Provisional application No. 63/220,845, filed on Jul. 12, 2021.

(51) Int. Cl.

*G06F 9/50* (2006.01)
*G06F 11/34* (2006.01)
*G06Q 30/018* (2023.01)

(52) U.S. Cl.

CPC .......... *G06F 9/505* (2013.01); *G06F 11/3495* (2013.01); *G06Q 30/018* (2013.01)

(58) Field of Classification Search

CPC ................. G06F 9/505; G06F 11/3495; G06F 2209/5015; G06F 9/5038; G06F 9/5072; G06F 9/5094; G06F 11/3006; G06F 11/3058; G06F 11/3433; G06Q 30/018

See application file for complete search history.

(56) References Cited

U.S. PATENT DOCUMENTS

| | | | |
|---|---|---|---|
| 8,392,574 B1 | 3/2013 | Shah et al. | |
| 9,348,394 B2 | 5/2016 | Harper, III et al. | |
| 9,532,488 B2 | 12/2016 | Crawford | |
| 9,930,109 B2 * | 3/2018 | Saffre | H04L 67/1008 |
| 10,084,658 B2 * | 9/2018 | Dabbagh | H04L 41/0895 |
| 10,754,698 B2 * | 8/2020 | Krishnan | H04L 67/131 |
| 2011/0035072 A1 | 2/2011 | Jackson | |
| 2014/0075222 A1 | 3/2014 | Jackson | |
| 2015/0317189 A1 | 11/2015 | Georgescu et al. | |
| 2015/0339159 A1 | 11/2015 | Gupta et al. | |
| 2016/0109916 A1 | 4/2016 | Li et al. | |
| 2017/0085637 A1 | 3/2017 | Cencini et al. | |

(Continued)

OTHER PUBLICATIONS

Extended Search Report for related European Patent Application 22842776.1 issued Apr. 9, 2025 14 pages.

(Continued)

*Primary Examiner* — Jorge A Chu Joy-Davila

(74) *Attorney, Agent, or Firm* — Pillsbury Winthrop Shaw Pittman, LLP

(57) ABSTRACT

A process includes obtaining a workload and a set of candidate computing resources and predicting amounts of carbon emissions attributable to executing the workload on different members of the set of candidate computing resources. The process also includes predicting measures of computing performance in executing the workload of the different members of the set of candidate computing resources and computing a set of scores based on the amounts of carbon emissions and the measures of computing performance. The process also includes orchestrating the workload based on the scores.

20 Claims, 5 Drawing Sheets

(56) References Cited

U.S. PATENT DOCUMENTS

| | | | | |
|---|---|---|---|---|
| 2018/0329741 | A1 | 11/2018 | Yuan et al. | |
| 2019/0171799 | A1 | 6/2019 | Crawford et al. | |
| 2019/0373521 | A1* | 12/2019 | Crawford | G06F 16/27 |
| 2020/0026562 | A1 | 1/2020 | Bahramshahry et al. | |
| 2020/0026563 | A1 | 1/2020 | Bahramshahry et al. | |
| 2020/0026564 | A1 | 1/2020 | Bahramshahry et al. | |
| 2020/0310852 | A1* | 10/2020 | Featonby | G06F 9/5077 |
| 2021/0144060 | A1 | 5/2021 | Cencini et al. | |
| 2021/0248523 | A1* | 8/2021 | Wick | G06Q 10/063 |
| 2021/0342185 | A1* | 11/2021 | Naidu | G06F 1/3206 |
| 2021/0373973 | A1* | 12/2021 | Ekins | G06F 9/5088 |

OTHER PUBLICATIONS

Guo Yuanxiong, et al.: "Energy and Network Aware Workload Management for Sustainable Data Centers with Thermal Storage", IEEE Transactions on Parallel and Distributed Systems, IEEE, USA, vol. 25, No. 8, Aug. 1, 2014 (Aug. 1, 2014), pp. 2030-2042, XP011554024, ISSN: 1045-9219, DOI: 10.1109/TPDS.2013.278 G06F [retrieved on Jul. 11, 2014].

Wiesner et al., "Let's Wait Awhile: How Temporal Workload Shifting Can Reduce Carbon Emissions in the Cloud," Middleware '21, Dec. 6-10, 2021, Virtual Event, Canada, arXiv:2110.13234v1.

Le et al., "Scheduling workloads in a network of datacentres to reduce electricity cost and carbon footprint," Sustainable Computing: Informatics and Systems, vol. 5, Mar. 2015, pp. 31-40.

Sverdlik, Yevgeniy, "Google Says Some Computing Its Data Centers Do Can Wait for Sunshine," Data Center Knowledge Apr. 22, 2020, https://www.datacenterknowledge.com/google-alphabet/google-says-some-computing-its-data-centers-do-can-wait-sunshine, pp. 1-7.

Cerero et al., "Productive Efficiency of Energy-Aware Data Centers," Energies MDPI Journal, Aug. 8, 2018, https://www.mdpi.com/1996-1073/11/8/2053, pp. 1-17.

James et al., "A Low Carbon Kubernetes Scheduler," International Communication Technology for Sustainability (ICT4S) 2019 Conference, Proceedings of the 6th International Conference on ICT for Sustainability, vol. 2382, Jun. 2019, extension://efaidnbmnnnibpcajpcglclefindmkaj/https://ceur-ws.org/Vol-2382/ICT4S2019_paper_28.pdf, pp. 1-10.

Koningstein, Ross, "We now do more computing where there's cleaner energy," Sustainability Blog, https://blog.google/outreach-initiatives/sustainability/carbon-aware-computing-location/, May 18, 2021, pp. 1-4.

Cabral, Aly, "Announcing Green Compute on Cloudfare Workers," The Cloudflare Blog, https://blog.cloudflare.com/announcing-green-compute/, Jul. 27, 2021, pp. 1 to 8.

Web Archive of WattTime.org, https://web.archive.org/web/20210616004257/https:/www.watttime.org/, Jun. 16, 2021, pp. 1 to 6.

Communication pursuant to Rules 70(2) and 70a(2) EPC for related European Patent Application 22842776.1 issued Apr. 29, 2025, 1 page.

* cited by examiner

REDUCING THE ENVIRONMENTAL IMPACT OF DISTRIBUTED COMPUTING

CROSS-REFERENCE TO RELATED APPLICATIONS

The present patent filing claims the benefit of U.S. Provisional Patent Application No. 63/220,845, filed 12 Jul. 2021, titled REDUCING THE ENVIRONMENTAL IMPACT OF DISTRIBUTED COMPUTING. The entire contents of each afore-mentioned patent filing is hereby incorporated by reference.

BACKGROUND

1. Field

The present disclosure relates generally to distributed computing architectures and, more specifically, to workload management.

2. Description of the Related Art

Distributed applications often rely on different computing services, such as data storage, computation, and content delivery. The workloads for these distributed applications may be allocated across multiple data centers in different geolocations by a scheduler. The scheduler may control computing operations and power consumption of the data center.

SUMMARY

The following is a non-exhaustive listing of some aspects of the present techniques. These and other aspects are described in the following disclosure.

Some aspects include a process that includes obtaining, with an orchestration system, a workload of a distributed application and a set of candidate computing resources. The process also includes predicting amounts of carbon emissions attributable to executing the workload on different members of the set of candidate computing resources and measures of computing performance in executing the workload of the different members of the set of candidate computing resources. The process also includes computing a set of scores based on the amounts of carbon emissions and the measures of computing performance. The process also includes orchestrating the workload based on the set of scores.

Some aspects include a process that includes obtaining a first plurality of scores of a plurality of data centers executing a plurality of workload tasks of a distributed application, where the distributed application is associated with a set of performance criteria, and where the first plurality of scores indicates environmental impacts of the plurality of data centers. The process also includes obtaining a set of telemetry values indicating a utilization of the plurality of data centers and a data network in communication with the plurality of data centers by the plurality of workload tasks. The process also includes determining a workload task distribution based on the set of performance criteria, where the workload task distribution allocates workload tasks of the distributed application to a subset of data centers of the plurality of data centers. The process also includes determining a subset of scores the first plurality of scores, where each respective score of the subset of scores is associated with a respective data center of the subset of data centers. The process also includes determining a path through the data network connecting a first data center of the subset of data centers with a second data center of the subset of data centers, where nodes of the path are associated with a second plurality of scores that indicate environmental impacts of the nodes of the path. The process also includes determining a sum of the subset of scores and the second plurality of scores. The process also includes determining whether the sum satisfies a set of selection criteria. The process also includes orchestrating a set of computing resources comprising the first data center and the second data center to execute the distributed application in response to the sum satisfying the set of selection criteria.

Some aspects include a system that includes one or more processors and memory storing instructions that, when executed by the processors, cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
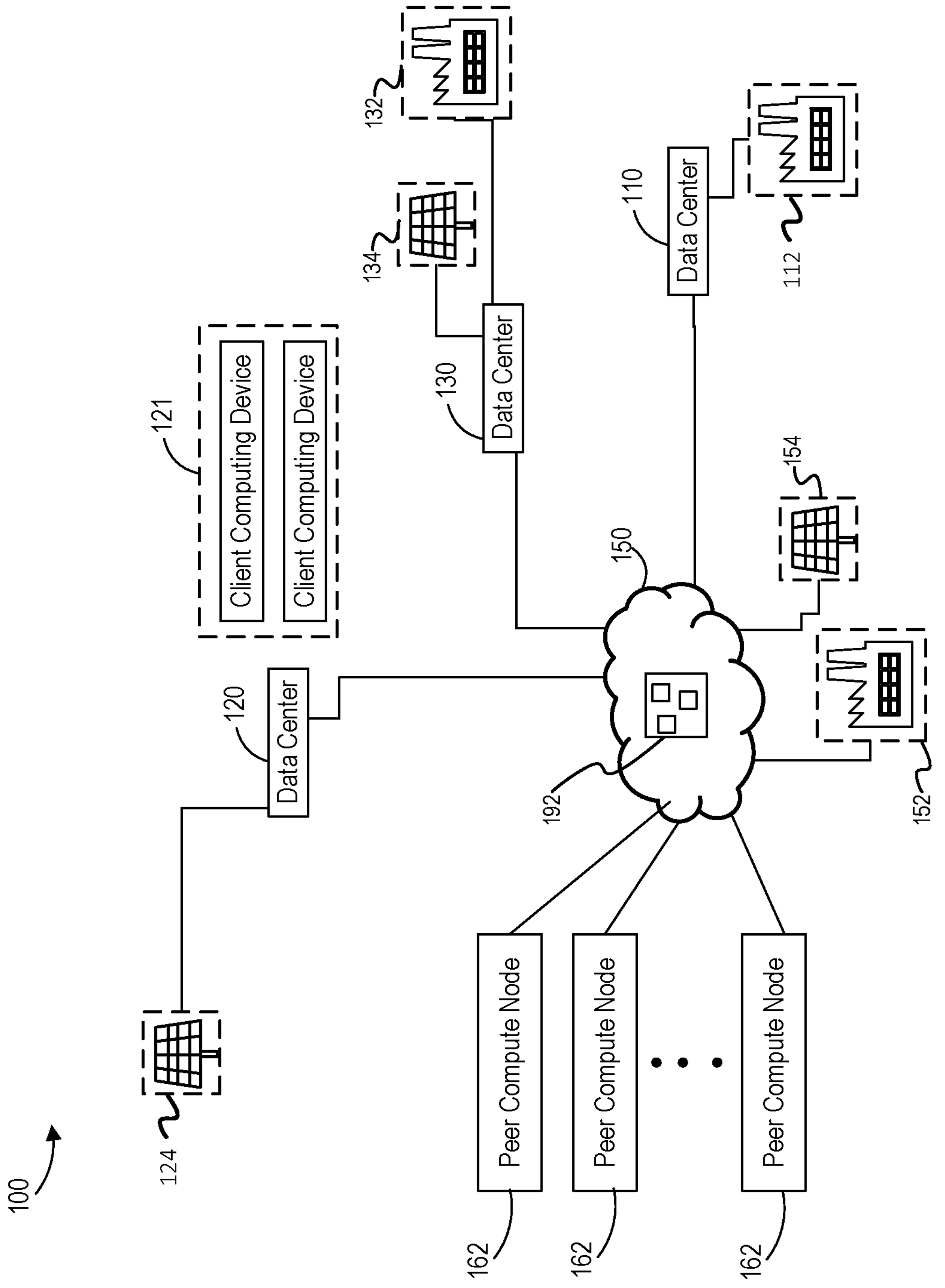
FIG. 1 illustrates an example computing environment in which various networks may be implemented in accordance with the present techniques in some example embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION

To mitigate the problems described herein, the inventors had to both invent solutions and, in some cases, just as importantly, recognize problems overlooked (or not yet foreseen) by others in the field of distributed computing and DevOps. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Existing workload schedulers generally do not account for environmental objectives, such as satisfying a threshold percentage of renewable energy use or meeting carbon-neutral goals. In part, this is because many schedulers are blind to environmental effects. Computing operations may be distributed across multiple data centers that are each powered by different types of energy sources, and the scheduler generally does not have information about the sources of energy in use. For instance, a scheduler generally has no way to know whether a workload is being dispatched to a data center drawing most of its power from a coal-fired power plant or a data center drawing most of its power from a solar farm. In addition, use of a data network between data centers may incur its own environmental impact, which may also depend on energy sources in use and their respective locations. Further, the composition of power supplied onto an electrical grid (or otherwise available to a data center) by sources of electrical energy in any given location may change over time, as renewables become more or less effective with the weather or time of day and generating capacity comes online or goes offline.

Some embodiments may orchestrate workloads based on environmental impact while balancing against other computing-performance objectives, like latency, bandwidth, time-to-first byte, uptime, and various other aspects of service-level agreements. Some embodiments determine, for a given workload, a set of candidate computing resources (e.g., data centers or network paths) and, for each candidate computing resource, for the workload, compute a set of carbon footprint scores or other environmental impact scores and a set of computing-performance scores. Some embodiments may then use those scores for workload task allocation, balancing between performance and environmental impact. Some embodiments may choose network paths based on environmental impact, or account for environmental impacts of default routes to or from distributed computing resources. Thus, some embodiments may orchestrate (e.g., schedule or provision) computing resources by balancing environmental impact goals with a set of performance criteria. In some cases, the balance may be specified for or by different tenants in a multi-tenant computing platform, e.g., in policies associated with respective tenants or groupings of tenants. Furthermore, some embodiments may orchestrate a workload using a set of data centers assigned to a single owner by configuring or managing computer systems of the set of data centers. Alternatively, or in addition, some embodiments may orchestrate a workload using a plurality of data centers having multiple owners. For example, a scheduler may orchestrate a workload using a Microsoft Azure™ modular data center assigned to a first owner and an Amazon AWS™ modular data center assigned to a second owner.

Some embodiments may track a carbon footprint, freshwater water use, pollution emission, or another environmental impact of data center use on a tamper-evident, distributed (e.g., decentralized) ledger. Some embodiments may use values stored on the tamper-evident, distributed ledger to prove or assert compliance with environmental criteria via an auditable data trail stored on the ledger. Some embodiments may update the distributed ledger to indicate an amount by which a distributed application satisfies (or does not satisfy) environmental sustainability criteria. For example, some embodiments may store, on a blockchain, a difference between a carbon threshold encoded in a policy and a sum of carbon footprint scores, such as for each workload (or workload application) that is executed by one or more data centers (or a set of data centers) and a data network (i.e., computing network) connecting one or more of the data centers (or the set of data centers). Some embodiments may evaluate a workload and a data network used for workload data individually and generate a combined score based on a sum, measure of central tendency, or weighted sum of the scores. Some embodiments may evaluate a workload and a data network used for workload data in combination, in some cases without generating component scores for each, for example, by scoring workload tasks and generating a score for a workload based on the scores for the tasks. Some embodiments may call a smart contract on a blockchain computing platform to purchase carbon offset credits corresponding to predicted for measured carbon emissions associated with computations or tasks, and some embodiments may allocate workloads or one or more tasks of a workload based on the price or availability of such offset credits, e.g., determining to allocate all or some of a workload in a more carbon-sensitive manner when it can be offset. Alternatively, or in addition, some embodiments may implement smart contracts to implement environmental sustainability programs. For example, some embodiments may receive a message indicating that the electrical energy source for a data center has been changed from a renewable resource to a non-renewable resource. In response, some embodiments may execute a smart contract to make a carbon offset purchase corresponding with the increase in the carbon footprint resulting from the change based on the decision weights of a computing policy. Carbon emissions can be characterized in a variety of ways and need not be expressly quantified in units of mass of carbon to serve as a measure of carbon emissions. For instance, carbon emissions may be characterized with ordinal rankings (e.g., low, medium, and high), binary values (e.g., too high or not too high) or cardinal values in various units (e.g., a number of carbon offsets that need to be purchased to offset expected emissions, a volume or mass of carbon emissions expected, or the like).

Example Systems

FIG. 1 illustrates an example computing environment in which various networks may be implemented in accordance with In some examples, the computing environment 100 is a distributed computing environment and includes a first data center 110, a second data center 120 that is geographically separated from the first data center 110, and a third data center 130 that is geographically separated from both the first data center 110 and the second data center 120. The first data center 110 may be powered by a carbon-emitting energy source 112. The second data center 120 may be powered by a solar energy source 124. The third data center 130 may be powered by a carbon-emitting energy source 132 and a solar energy source 134. Illustrated examples and example embodiments describing a certain type of energy source (e.g., solar) should not be construed as limited to only that type of energy source, but rather as an example energy source having trade-offs of availability, sustainability, and the like that disclosed techniques may take into account for controlling and scheduling workloads. Other example energy sources may include, but are not limited to, wind, tidal, hydroelectric, geothermal, nuclear, among other examples of energy sources described herein. In accordance with the disclosed techniques, various example embodiments may perform one or more operations to shift a set of workload tasks of an application to different combinations of the data centers 110, 120, and 130 based on their corresponding environmental impact and a set of performance criteria of the application.

An orchestration system may be used to control the workloads and tasks thereof being executed by the data centers 110, 120, or 130, where embodiments of the orchestration system may be executed by one or more of the data centers 110, 120, 130, or another computing device. As described elsewhere in this disclosure, computing operations performed by the data centers 110, 120, or 130 that are assigned environmental impact scores performed within containers of a Kubernetes instance, where tenancy on the containers may permit the monitoring or orchestration operations described in this disclosure. Furthermore, one or more of the data centers 110, 120, 130, or other computing devices of the distributed computing environment 100 may be connected to each other via a network 150. For example, a set of client computing devices 121 may communicate with a data center (e.g., data center 120) to initiate one or more functions of an application. Instructions sent by the set of client computing devices 121 may then cause one or more workload tasks of the application to execute on the data center 120 or another data center, such as the data center 130 or the data center 110. After finishing one or more operations, results of application-related computations may be sent from the data center 120 via a wireless communication device to the set of client computing devices 121. The term "orchestration system" is a term of art in the field of DevOps that includes applications performing automated configuration, coordination, and management of computer systems and software.

A first portion of the network 150 may be powered by the carbon-emitting energy source 152 and a solar energy source 154. In some embodiments, the distribution of workload tasks for computing resources such as the data centers 110, 120, and 130 may be controlled by one or more programs executing on one or more of the data centers 110, 120, or 130. Alternatively, or in addition, some embodiments may control the distribution of workload tasks via a remote computing device that is in connection with the network 150. Alternatively, or in addition, some embodiments may control the distribution of workload tasks amongst the data centers 110, 120, and 130 based on a smart contract program stored on a tamper-evident, distributed ledger encoding records of a plurality of previous values in a directed acyclic graph of cryptographic hash pointers. In some embodiments, the tamper-evident, distributed ledger may be hosted by a plurality of peer compute nodes that may include the data centers 110, 120, or 130 or the set of peer compute nodes 162. For example, some embodiments may execute a smart contract program that causes an increase in the workload tasks to be performed by the second data center 120 in conjunction with a score change, such as a change in an amount of a digital asset.

In some embodiments, communication between the data centers 110, 120, or 130 may be directed through a network path through the network 150, where data may be transported along the network path via a set of network devices 192. Some embodiments may organize the network path through the network in a way to reduce an environmental impact caused by use of the network devices 192. For example, some embodiments may determine that information may be transferred from the first data center 110 to the second data center 120 via a first network path through the network 150 or a second network path through the network 150. Some embodiments may then determine an environmental impact score for each of the network paths. For example, some embodiments may determine a set of scores correlated with carbon footprint amounts. Some embodiments may then select the second network path in response to a determination that the second network path has a lesser environmental impact score than the first network path. For example, some embodiments may determine that a first network path uses an amount of energy such that 80% of the energy is provided by the carbon-emitting energy source 152 and 20% of the energy is provided by the solar energy source 154. Some embodiments may also determine that a second network path uses an amount of energy such that 80% of the energy is provided by the solar energy source 154 and 20% of the energy is provided by the carbon-emitting energy source 152. Some embodiments may then select the second network path based on a determination that the second network path has a lesser environmental impact than the first network path.

In some embodiments, the network 150 may include a set of peer compute nodes 162, where some or all of the data centers 110, 120, or 130 may be a part of a plurality of peer compute nodes that includes the set of peer compute nodes 162. As described elsewhere in this disclosure, some embodiments may host a tamper-evident, distributed ledger on a set of computing devices such as the data centers 110, 120, or 130 or the set of peer compute nodes 162. In some embodiments, a tamper-evident, distributed ledger may be used to store data for a smart contract to execute exchanges between different data centers or organizations such as an exchange of a computing resource for a digital asset. For example, some embodiments may determine that the execution of a workload of an application at the first data center 110 may incur an environmental impact, such as a carbon footprint amount. Some embodiments may then determine that the workload is to be executed at the first data center 110 to satisfy a performance criterion of the application and, in response, search through a listing of exchanges based on the carbon footprint amount. Some embodiments may then initiate an exchange between a first organization and a second organization based on the carbon footprint amount that indicates a first change in a carbon accumulation value by the carbon footprint amount and a second change in a digital asset value by a listed price. In some embodiments, the exchange may be recorded on a tamper-evident, distributed ledger hosted by the set of peer compute nodes 162.

Figure 2:
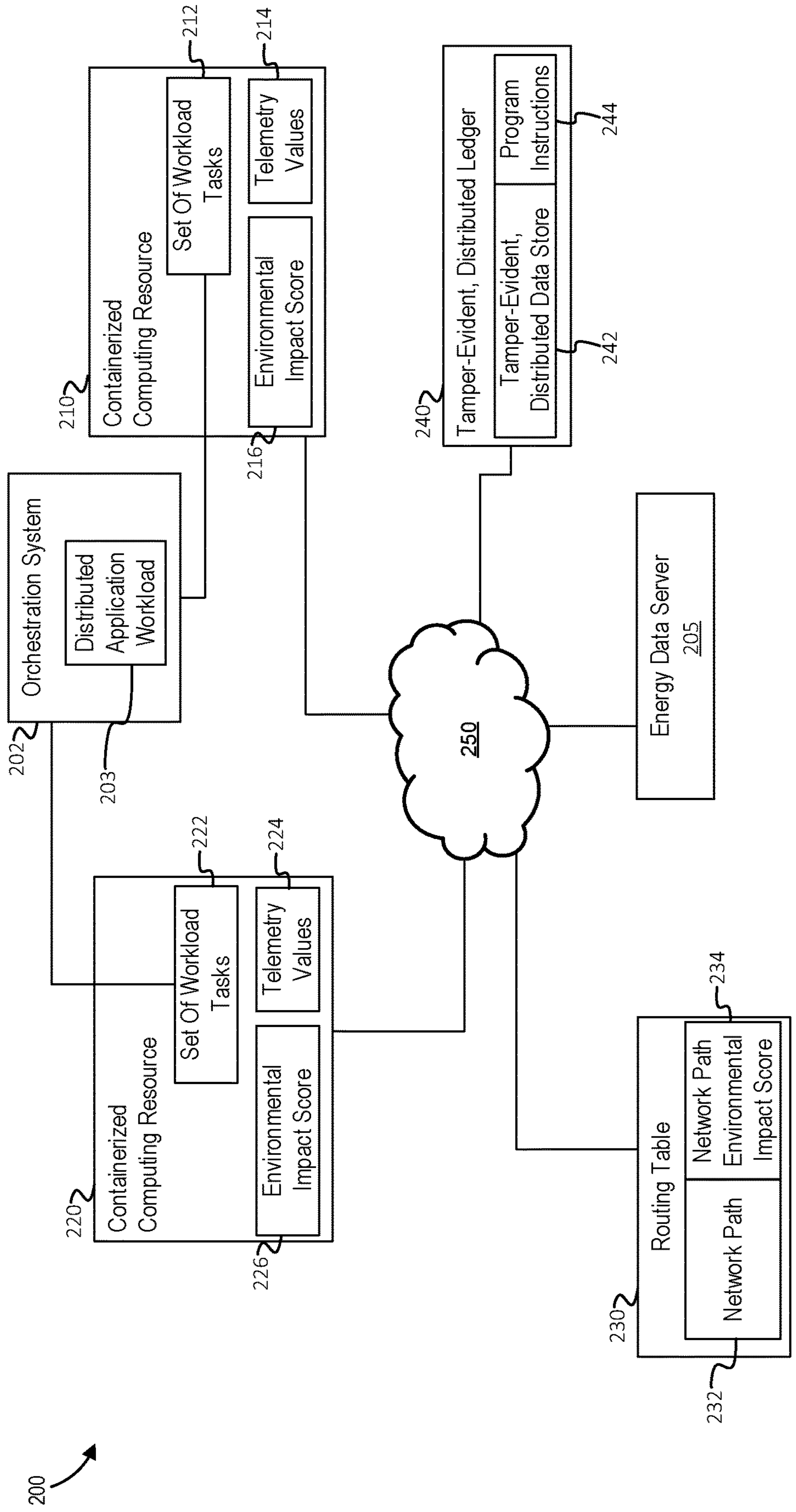
FIG. 2 illustrates a logical-and-physical-architecture block diagram of consumption-tracking computing infrastructure by which the present techniques may be implemented in accordance with some example embodiments.

FIG. 2 illustrates a logical-and-physical-architecture block diagram of consumption-tracking computing infrastructure by which the present techniques may be implemented in accordance with some example embodiments In some embodiments, the architecture 200 includes one or more containerized computing resource, such as a first containerized computing resource 210 and a second containerized computing resource 220. An orchestration system 202 may shard an application workload into sets of tasks which may be distributed to different computing resources, such as containerized computing resources, to perform the workload. For example, the orchestration system 202 may shard an application workload 203 to create a first set of tasks 212 and a second set of tasks 222 for distribution. In turn, for example, a first containerized computing resource 210 may be allocated to execute the first set of tasks 212 and a second containerized computing resource 220 may be allocated to executed the second set of tasks 222. While only two containerized computing resources are show, embodiments contemplate scaling of the number of such containerized computing resources, such as to include tens, hundreds, or thousands or more instances of containerized computing resources to which a set of tasks from an application workload may be distributed, such as by example orchestration system 202. As described elsewhere in this disclosure, some embodiments may use containers that provide environmental impact monitoring to permit orchestration of workloads based on environmental impact scores.

Some embodiments may collect telemetry values 214 indicating the utilization of the first containerized computing resource 210 and a second set of telemetry values 224 indicating the utilization of the second containerized computing resource 220. Some embodiments may obtain energy source data from an energy data server 205 via a set of web messages, such as web requests. A web request may include a hypertext transfer protocol (HTTP) web request sent to an application program interface (API) of a server. An example of such an API may be a RESTful API. The web request may include a set of geolocations of computing devices or information about connections to an energy grid or include a query identifying an energy source type. Some embodiments may then receive an HTTP web response from the energy data server 205, where the web response may include a set of environmental impact values. In some embodiments, the environmental impact values may include quantitative conversion rates indicating an amount of environmental impact per unit of energy or power. For example, the environmental impact values may include a rate such as "30" and a unit type "kilograms per kilojoule" to indicate that 30 kilograms of carbon dioxide gas is emitted by the power source used by a computing resource for each kilojoule used. Embodiments may use other unit types, such as energy (e.g., joules) used over time (e.g., seconds), i.e., watts (joules/second) or kilowatts per hour and the like, such as based on the amount of energy used over a timeframe from a given energy source type. Alternatively, or in addition, some embodiments may assign categorical values, indicating an energy source type, such as "solar" or "coal." Some embodiments may then use the environmental impact values obtained from the energy data server 205 to determine a first environmental impact score 216 and a second environmental impact score 226 for the first containerized computing resource 210 and the second containerized computing resource 220, respectively.

Some embodiments may determine a network path (i.e., "route") across a network 250 used to communicate data between the first containerized computing resource 210 and the second containerized computing resource 220. Some embodiments may use a routing table 230 to determine the network path, where the routing table 230 may include a set of network paths 232 and a corresponding set of network path environmental impact scores 234. Some embodiments may then generate a workload distribution value based on the first environmental impact score 216, second environmental impact score 226, and the network path score from the set of network path environmental impact scores 234 to determine a workload distribution value (e.g., by summing the scores). Some embodiments may further scale the environmental impact scores with a weighting factor and weight a network performance value with a second weighting factor to determine the workload distribution value.

Some embodiments may store environmental impact scores, workload distribution values, or other values described in this disclosure on a tamper-evident, distributed ledger 240 that is hosted by a plurality of peer compute nodes. In some embodiments, the tamper-evident, distributed ledger 240 may include or otherwise access a tamper-evident, distributed data store 242 and may include or access program instructions 244. Some embodiments may execute a database transaction in response to program instructions 244, where the program instructions 244 may include instructions for a smart contract application hosted by the tamper-evident, distributed ledger 240. For example, some embodiments may execute a smart contract to execute an exchange between a first and a second organization, such as where the first organization may purchase a carbon tax credit from the second organization for a digital asset or representation of currency. In some embodiments, executing an exchange between organizations may include calling a Turing-complete block-chain-based smart contract to execute the exchange or record data to a tamper-evident, distributed data store 242 used by the smart contract. For example, some embodiments may call a smart contract hosted on an Ethereum platform based on a determination that executing an application requires an amount of computing resources that will incur a carbon footprint amount equal to ten metric tons and cause a transaction based on the carbon footprint amount.

Flowcharts

The processes presented in this disclosure are intended to be illustrative and non-limiting, as in generally true of the present description. In some embodiments, for example, the methods may be accomplished with one or more additional operations not described or without one or more of the operations discussed. Additionally, the order in which the processing operations of the methods are illustrated (and described below) is not intended to be limiting, which is not to suggest that other descriptions are limiting. In some embodiments, the methods may be implemented in one or more processing devices (e.g., a digital processor, an analog processor, a digital circuit designed to process information, an analog circuit designed to process information, a state machine, or other mechanisms for electronically processing information). The processing devices may include one or more devices executing some or all of the operations of the methods in response to instructions stored electronically on an electronic storage medium, like a tangible, non-transitory, computer-readable medium storing instructions (like computer program instructions), the operations of which may be effectuated when executed by a computing processor. The processing devices may include one or more devices configured through hardware, firmware, or software to be specifically designed for the execution of one or more of the operations of the disclosed processes or methods.

In some embodiments, the computing environment 100 may execute one or more routines described in this disclosure. In some embodiments, the various operations of the processes 300 or 400 may be executed in a different order, operations may be omitted, operations may be replicated, additional operations may be included, some operations may be performed concurrently, some operations may be performed sequentially, and multiple instances of the processes 300 or 400 may be executed concurrently, none of which is to suggest that any other description herein is limited to the arrangement described. In some embodiments, the operations of the processes 300 and 400 may be effectuated by executing program code stored in one or more instances of a machine-readable non-transitory medium, which in some cases may include storing different subsets of the instructions on different physical embodiments of the medium and executing those different subsets with different processors, an arrangement that is consistent with use of the singular term "medium" herein.

Figure 3:
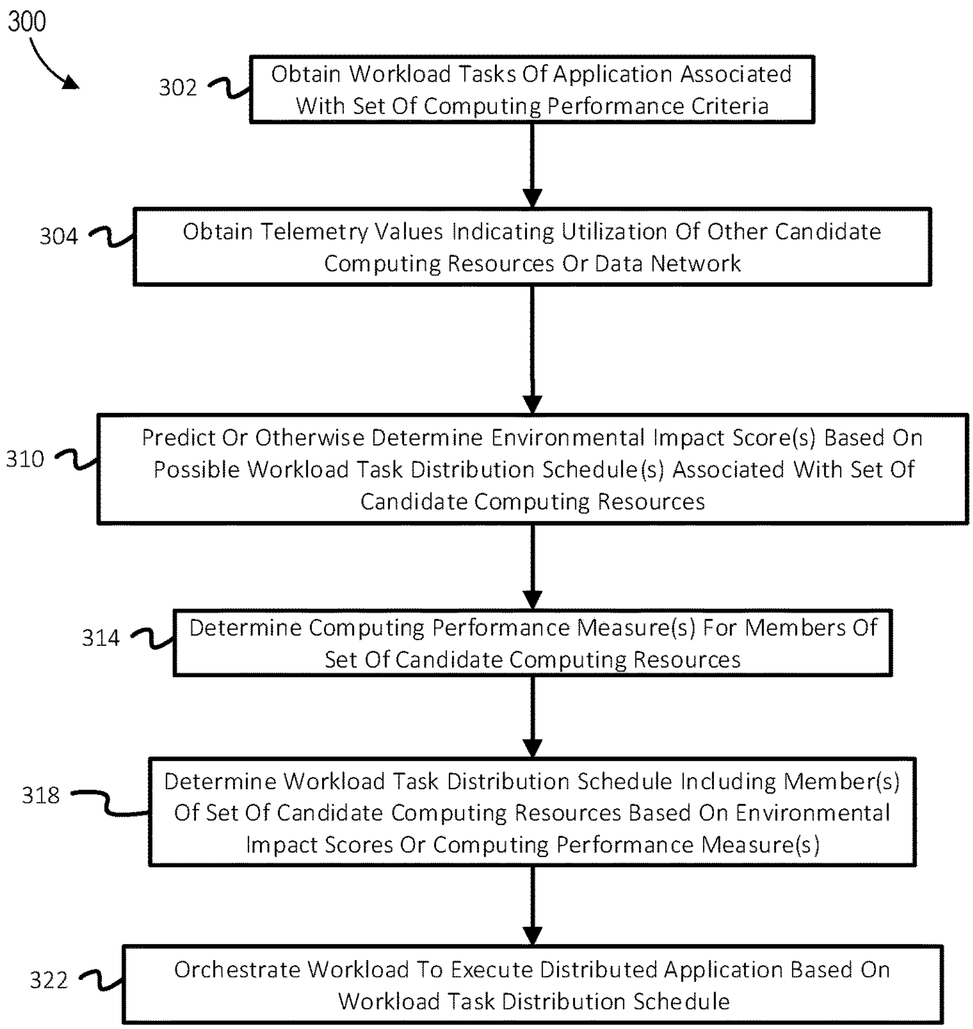
FIG. 3 illustrates a flowchart of a process for tracking and responding to resource consumption in accordance with some example embodiments.

FIG. 3 illustrates a flowchart of a process for tracking and responding to resource consumption in accordance with some example embodiments In some embodiments, operations of the process 300 may include obtaining a set of workload tasks of an application, like a distributed application, associated with a set of performance criteria, as indicated by block 302. A distributed application may be executed by a plurality of data centers, where the distributed application may provide advantages over single-computer applications in the form of increased reliability, increased scalability, and reducing possible points application failure.

In some embodiments, an application workload may be fragmented into a plurality of workload tasks that may be distributed across a plurality of data centers or other computing resources that are geographically distributed. For example, executing an application may include performing data processing operations to aggregate values across a large population of records, search through the records for a specific set of values, and perform a series of computations based on the specific set of values. Some embodiments may redistribute a portion of the data from the collected records to other data centers, where the other data centers may then perform a portion of the data processing operations and provide the results of the series of computations. In some examples, each data center may store the data (or a version thereof) upon which the operations are performed and tasks of a distributed application, which may include operations like those described above, on the data may be distributed without any requirement to distribute data in every or most cases, or an amount of data distributed my be reduced (e.g., by distributing a delta between versions of data rather than all the data). As described elsewhere in this disclosure, some embodiments may re-distribute a set of workload tasks by scaling down a first computing resource being used and scaling up a second computing resource being used to execute one or more operations of an application. In some examples, data distributed to a computing resource corresponds to a portion of data upon which operations of tasks (e.g., corresponding to a distributed application) that are allocated to the computing resource are to be performed, and some other portion of data may not be allocated to the computing resource but rather another computing resource to which other tasks corresponding to the distributed application that perform operations on the other portion of data are allocated. Furthermore, different distributions of workload tasks may characterize or otherwise indicate different workload task distribution schedules. As described elsewhere in this disclosure, some embodiments may generate a plurality of workload task distribution schedules and select one schedule of the plurality of workload task distribution schedules for use when orchestrating a workload.

In some embodiments, the set of performance criteria may include one or more various requirements for target application performance, such as a latency, bandwidth, time-to-first byte, data geofencing, network throughput, availability, measure of central tendency of a response time (e.g., an average application response time), a count of the application instances, a request rate capacity, or the like. For example, the set of performance criteria may include a requirement that an average application response time be satisfied, where the response time may represent a response time for an application executing on a set of client computing devices in communication with a data center. Enforcing the performance criterion may cause the selection of a subset of data centers to execute an application workload that will satisfy the average application response time. Some embodiments may have a plurality of performance criteria, or some or all of the performance criteria may be different from a set of telemetry values described elsewhere in this disclosure. For example, some embodiments include a first criterion requiring that operations to obtain a result is performed within a time threshold and a second criterion that a request-response latency between a set of client computing devices in communication with an application and any data center used to execute the application is less than a latency threshold.

As used in this disclosure, a computing resource may include a specific hardware component or a combination of hardware components. For example, a computing resource may include a set of processors, memory storage, graphics processing units, tensor processing units, a data center, a portion of a data center, or the like. Alternatively, or in addition, a computing resource may be a virtual computing resource. For example, a computing resource may include a set of containers, virtual machines (VM), unikernels, Lambda functions, or non-virtualized computing devices, or the like. Additionally, while some embodiments may perform a set of workload tasks distributed across multiple data centers for an application, some embodiments may orchestrate workloads isolated to a single computing resource. For example, some embodiments may execute a workload of an application by executing the entirety of the workload on a single data center. Furthermore, it should be understood that some embodiments may orchestrate workloads of multiple applications by allocating the workload tasks of the multiple applications to different data centers using operations described in this disclosure in a manner similar to allocating workload tasks of a distributed application.

In some embodiments, operations of the process 300 may include obtaining telemetry values indicating the utilization of candidate computing resources or of a data network connecting the candidate computing resources, as indicated for block 304. Telemetry values may indicate a utilization of a set of candidate data centers usable to execute workload tasks or other candidate computing resources, where the telemetry values may include processor usage, memory usage, data plane usage, control plane usage, input output (I/O) usage, or the like. For example, telemetry values may indicate a count of cycles being used by a processor at a first data center, an amount of random-access memory being used at a second data center, or the like. As described elsewhere in this disclosure, the telemetry values may be used to indicate a computing resource capability to satisfy a set of performance criteria, to indicate an energy consumption value of the computing resource, to predict a future value thereof, or the like.

Some embodiments may perform one or more data transformations to telemetry values, bin the data, or determine results based on the data transformations. For example, some embodiments may ingest telemetry values such as data throughput provided by Synse™ or other data streams. Some embodiments may perform transforms on the data and apply a set of filters to organize the set data into a set of data buckets or send the data to an external data collection agent. Furthermore, some embodiments may provide the transformed telemetry to a rules engine that may further modify the telemetry data, generate additional values based on the telemetry data, delete values of the telemetry data, or the like.

Some embodiments may report or store the telemetry values on a control node or master control node, where the control node or master control node may be hosted by one or more of the computing resources of the set of candidate computing resources. Alternatively, or in addition, the telemetry values may be reported to or stored on another computing device that is distinct from the set of candidate computing resources. For example, some embodiments may report the telemetry values to a remote computing device used to administrate or otherwise control the set of candidate computing resources.

Some embodiments may also obtain telemetry values of a data network that is used to connect a set of candidate computing resources. For example, some embodiments may obtain telemetry values such as a bandwidth usage, packet loss, retransmission, throughput, latency, availability, or connectivity. For example, some embodiments may obtain a first latency measurement of a first network path and a second latency measurement of a second network path between two nodes of the data network. As discussed elsewhere in this disclosure, some embodiments may select network paths of a data network based on an environmental impact criterion or a performance criterion of an application. Furthermore, some embodiments may determine the performance criterion of the application based on the specific application itself or a configuration record associated with the application.

In some embodiments, operations of the process 300 may include predicting or otherwise determining a set of environmental impact scores based on a set of possible workload task distribution schedules associated with the set of candidate computing resources, as indicated for block 310. Some embodiments may obtain, predict, or otherwise determine environmental impact scores such as a carbon footprint amount, electrical energy consumption value, a noise generation value, a water use value, a pollutant generation value, or the like. In some embodiments, an environmental impact score may be computed from other environmental impact scores or other metrics. For example, some embodiments may determine a carbon footprint based on an electrical energy consumption value.

In some embodiments, the environmental impact score may be determined based on a set of environmental-impact-related values. For example, some embodiments may obtain a conversion value representing an amount of carbon footprints (or other types of carbon emissions) per kilowatt-hour via an API of an external database. Some embodiments may then determine a total carbon footprint value of a data center based on an energy consumption value and the conversion weight, where the energy consumption value may be obtained from a sensor obtaining telemetry values of a data center.

Some embodiments may obtain environmental-impact-related values such as a conversion weight, price, energy distribution mixture, or the like from an API of a government database, an API of a utility database, an API of a private database, or the like. For example, some embodiments may send a web request to an API of a third-party service, where the request may include a location of a data center, an electric power consumption value, or a query identifying energy source types. Some embodiments may then receive a response from the third-party service that includes a carbon footprint value. Alternatively, or in addition, some embodiments may obtain an environmental-impact-related value using a web-crawling agent to obtain the values from a webpage or another type of internet-accessible set of data. For example, some embodiments may download a PDF that includes a set of data tables that stores a carbon dioxide generation rate per kilowatt-hour for different regions.

Some embodiments may an predict environmental impact score for members of a set of candidate computing resources associated with a workload task distribution schedule for executing an application based on an anticipated amount of computing resource consumption for different combinations of candidate computing resources. For example, some embodiments may use an orchestration system to predict an amount of user data that is to be received for an application at a first data center that must then be processed using one or more operations of the application. Some embodiments may then predict a number of computing resources to be used in a future six-hour interval with respect to combinations of candidate computing resources, where each different combination is associated with a different workload task distribution schedule. For example, different members of a combination of candidate computing resources may provide different amounts of processor use, memory use, graphic card use, or the like for the execution of the application.

As described elsewhere in this disclosure, some embodiments may determine environmental impact scores for different combinations of candidate computing resources. For example, some embodiments may determine a sum of carbon footprint amounts (i.e., "sum carbon footprint amount", "sum carbon emission amount", etc.) based on a sum of the carbon footprints of a set of candidate computing resources or other carbon emissions of the set of candidate computing resources. Some embodiments may determine which combination of candidate computing resources to use based on the sum emission footprint amount associated with the combination of candidate computing resources, where the combination of candidate computing resources may characterize or be used to determine a possible workload task distribution schedule. For example, some embodiments may select a set of candidate computing resources to use to execute an application workload based on a determination that the associated sum carbon footprint amount is less than a carbon footprint threshold. In some embodiments, the carbon footprint threshold may be associated with the account record of a company or another organization. Alternatively, the carbon footprint threshold may be set to a default value, such as "0" or a regulation-mandated value obtained from a government database.

As described elsewhere in this disclosure, some embodiments may obtain metrics indicating that a data center or other computing resource may obtain power from a plurality of energy source types. In some embodiments, each respective data center of a set of data centers may be assigned a respective score representing an environmental impact. For example, a first data center may obtain power from a solar plant and from a natural gas plant, where the two generators may have different carbon footprint scores. Some embodiments may obtain a probability weight that indicates that 80% of the power used by the data center is provided by the solar plant and a probability weight that indicates that 20% of the power used by the data center is provided by the natural gas plant. Some embodiments may then modify the carbon footprint score of the data center by the two weighting values. For example, some embodiments may update a carbon footprint score of a set of workload tasks being executed by the data center by summing a first product and a second product, where the first product is the carbon footprint score of the solar generator multiplied by 80% and the second product is the carbon footprint score of the natural gas plant multiplied by 20%. Furthermore, some embodiments may normalize an environmental impact score. For example, some embodiments may compare a carbon footprint score equal to 100 kilograms per kilowatt-hour to a baseline value, such as 500 kilograms per kilowatt-hour, resulting in a normalized carbon footprint score equal to 0.2.

In some embodiments, a history of past energy use associated with an application may be used to predict or otherwise determine environmental impact scores for a respective workload task distribution schedule associated with a respective combination of candidate computing resources. For example, some embodiments may use a machine learning model, such as a long-short-term-memory (LSTM) neural network model or another recurrent neural network model, to predict future energy use. Some embodiments may use a set of obtained telemetry values of one or more computing resources to predict future energy use. Some embodiments may further use probabilistic relationships between variables of interest to determine future energy use or other values related to an environmental impact score. Such variables may include data use categories obtained from application-specific data, computation time, and energy use, or the like. For example, some embodiments may use a Bayesian Belief Network to determine a set of values, such as by determining joint probabilities based on different probability distributions associated with an environmental impact score or the variables described above. Similarly, some embodiments may use telemetry values and machine learning models to determine a set of computing performance measures.

In some embodiments, operations of the process 300 may include determining measures of computing performance for members of the set of candidate computing resources, as indicated for block 314. Some embodiments may use subsets of the candidate computing resources described above when determining measures of computing performance. For example, some embodiments may have previously determined a carbon footprint amount for the use of a first and second data center for the purposes of executing an application. Some embodiments may then determine a measure of computing performance, where the measure may include as a total amount of memory to be allocated by the two data centers, an average response time, a total number of flops to be performed by the two data centers, or the like.

Some embodiments may determine the set of computing performance measures of a set of data centers or other computing resources based on telemetry data associated with the set of data centers or other computing resources. For example, some embodiments may retrieve processor performance values, a known amount of available memory, a known amount of cache memory available for use, or the like. Some embodiments may sum a set of known values and compare the sum to a performance criterion. For example, some embodiments may sum the available memory of a first data center and a second data center for use as a computing performance measure. Some embodiments may then determine whether the sum of the available memory satisfies a memory threshold of a performance criterion (e.g., by being greater than the memory threshold). In response to a determination that the memory threshold is satisfied, some embodiments select the first and second data centers for use in a workload task distribution schedule, as described elsewhere in this disclosure. Otherwise, some embodiments may select a different set of data centers or other computing resources for use to execute a workload of an application.

Some embodiments may normalize a computing performance measure. For example, a set of workload tasks may be assigned a baseline computation time of 10 minutes. Some embodiments may predict that implementing a workload distribution causing the distribution of a set of workload tasks will take 8 minutes to complete. In response, some embodiments may normalize the computing performance measure to be equal to 0.8. Various other normalizations may occur, such as a normalization for memory usage, normalization for response time, normalization for latency, or the like. In addition, other values, such as environmental impact scores, may be normalized.

In some embodiments, operations of the process 300 may determine a workload task distribution schedule including members of the set of candidate computing resources based on the set of environmental impact scores or the set of computing performance measures, as indicated for block 318. A set of selection criteria may be used to determine a workload task distribution schedule. For example, some embodiments may compare a sum of environmental impact scores to one or more thresholds of a set of selection criteria to determine whether to use the workload task distribution schedule associated with the sum for workload orchestration.

Some embodiments may use an orchestration system to determine a workload task distribution schedule by first determining a plurality of workload distribution values based on performance scores and an environmental impact scores and then selecting a maximum or minimum value of the plurality of workload distribution values. For example, using one or more operations described above, some embodiments may determine a computing performance measure equal to 0.8, which indicates the expected speed-up over a baseline computation time by implementing a first workload task distribution schedule. Similarly, using one or more operations described in this disclosure, some embodiments may determine an environmental impact score equal to 0.4. Some embodiments may then weigh the scores by one or more weighting factors of a policy.

A policy may include weighting factors, criteria used to filter out schedules, or otherwise include other values indicating how computing resources are allocated or how network paths are selected. The weights or other values of a policy may provide a prioritization scheme. For example, some embodiments may multiply a performance score equal to 0.8 by a weighting factor equal to 0.25 and an environmental impact score equal to 0.4 by a weighting factor equal to 0.75 to receive the weighted performance score equal to 0.2 and 0.3, respectively. This operation results in the weighted sum 0.5, which may be used as a workload distribution value associated with the first workload task distribution schedule. Some embodiments may repeat these weighted sum operations to determine a plurality of other weighted sums as workload distribution values associated with a plurality of other workload distributions, such as a second workload distribution value equal to 0.9 for a second workload task distribution schedule. Some embodiments may then compare the workload distribution values and determine that the first workload distribution value is less than any other value of the plurality of workload distribution values. In response, some embodiments may select the first workload task distribution schedule to use for orchestration based on a determination the workload distribution value satisfies a selection criterion when the workload distribution value is a minimum value in a set of other workload distribution values.

In some embodiments, a policy may be linked to region-specific data via a set of APIs or via direct entry by a user. For example, the policy may be linked to a set of corporate or government servers that encodes a set of government regulations that differ across different states. As described elsewhere in this disclosure, different policies may determine different combinations of computing resources or networks to be used, where the different policies may indicate quantities associated with carbon emission values.

Some embodiments may use region-specific data to update a policy, where limitations, limits, or rules associated with specific regions may be used to update the weights associated with computing resources in different regions. For example, some embodiments may receive a first update to a policy that requires that a set of all data centers in a first region must use at least 50% renewable energy and receive a second update to the policy that requires that the set of all data centers in a second region must use at least 25% renewable energy. Some embodiments may that adjust a set of weights associated with the computing resources of the first and second regions to favor the use data centers that draw power from renewable energy sources. The weights for each respective data center or components of the data center may vary based on energy source type, total energy utilization, and whether the data center is in the first or second regions.

Some embodiments may use region-specific carbon tax quantities or values correlated with environmental impact to determine computing resource allocation for a workload. For example, different regions may assign different carbon credits for carbon emission or other carbon footprint values, where carbon credits may be transferrable across regions or specific to a single region. Some embodiments may then use measured surplus or deficit to engage in intra-region exchanges of computing resource allocations or cross-region exchanges of computing resource allocation. For example, an organization may be allocated an amount of compute time using a computing resource located in a first region in exchange for a surplus carbon credit amount of a second region. In some embodiments, the surplus carbon credit may be converted between different regions based on a conversion value of the carbon credit when transferred between the first and second regions.

Some embodiments may perform operations to determine a subset of data centers or other subset of computing resources from a plurality of computing resources. For example, after determining a set of environment cost scores for each respective data center of a set of data centers, some embodiments select a subset of data centers for executing a workload of an application. Some embodiments may select a single data center as the subset of data centers. Alternatively, some embodiments may select multiple data centers to use as the subset of data centers.

Similarly, some embodiments may select a network path from a plurality of network paths that enables coordination based on a corresponding set of environmental impact scores, as described elsewhere in this disclosure. For example, some embodiments may determine a first network path and a second network path having the same starting and ending nodes. Some embodiments may then select the first network path over the second network path in response to a determination that the first network path has a lower carbon footprint amount than the second network path. Some embodiments may then assign an allocation score to a network topology including the selected subset of data centers and the first network path connecting two data centers of the selected subset of data centers.

Some embodiments may select a workload task distribution schedule by concurrently balancing computing performance criteria with environmental impact based on a set of weights. Alternatively, some embodiments may first select a set of combinations of data centers determined to satisfy an environmental impact threshold and then determine a workload task distribution schedule based on a maximum or minimum of the computing performance measures of the workload task distribution schedules that satisfy the environmental impact threshold. For example, each respective subset of data centers of associated with a respective workload task distribution schedule of a subset of schedules may be selected based on a determination that the respective subset of data centers has a collective carbon footprint of less than 1000 kilograms. Some embodiments may then select the workload task distribution schedule amongst the subset of schedules indicating the most robust performance, such as a greatest number of processors, a least average response time, or the like. Alternatively, some embodiments may first select a set of combinations of data centers determined to satisfy a set of performance criteria and then determine a workload task distribution schedule based on a maximum or minimum of the environmental impact scores associated with the workload schedules that satisfy the set of performance criteria.

Furthermore, some embodiments may determine a workload task distribution schedule based on one score without consideration for other scores, such as by determining a workload task distribution schedule based on an environmental impact score without consideration for a computing performance measure. For example, some embodiments may select a set of candidate computing resources to use to execute an application workload by the least sum carbon footprint amount (e.g., a least sum carbon emission amount). Alternatively, some embodiments may use a default workload task distribution, such as implementing a policy to use the first computing resource indicated as available in a queue to execute a workload. Some embodiments may then redistribute a set workload tasks of the workload in response to a determination that an environmental impact is greater than an allowable environmental impact or that another computing resource associated with a lower environmental impact is available for use.

In some embodiments, operations of the process 300 may include orchestrating a workload to execute the distributed application based on the workload task distribution schedule, as indicated for block 322. As described elsewhere in this disclosure, a workload may be distributed into a plurality of workload tasks amongst a set of candidate computing resources in various ways. For example, an orchestration system may containerize a workload into a set of pods of a Kubernetes system, where different containers may be distributed across different geographically-separated computing resources to execute workload tasks to be performed by the containers. For example, some embodiments may determine, based on data traffic telemetry, that a first computing threshold has been satisfied and, in response, replicate a container image at a first data center to increase the amount of computing resources being used at the first data center. Similarly, some embodiments may reduce the amount of computing resource being used by a data center by removing containers from the data center. Alternatively, or in addition, some embodiments may scale the computing resources assigned to performing a set of workload tasks using a VM instance. For example, some embodiments may scale a workload at a data center by increasing the number of VM instances in order to satisfy a workload task schedule indicating that the data center is to be assigned an increased number of tasks.

Computer resources may be re-allocated upon a detected update to a score correlated with an environmental impact score in some embodiments. For example, some embodiments may perform operations that include re-allocating a new data center to a set of data centers used to execute a workload application after a determination that the type of energy source ("energy source type") used to power an initially used data center of the set of data centers was switched from a first energy source type to a second energy source type. For example, some embodiments may detect the energy source used to power a first data center is switched from a solar plant to a coal plant. In response, some embodiments may remove the first data center from a subset of data centers used to execute a workload of a distributed application and add a new data center that was not previously used to execute tasks of the workload to the subset of data centers.

In some embodiments, executing the workload of an application may include performing cryptographic mining to generate a unique value that satisfies a set of mining criteria. For example, some embodiments may increase the amount of electrical power provided to a first computing node of peer-to-peer computing nodes. The peer-to-peer computing nodes may be used to store blocks of a blockchain or another directed acyclic graphs with hash pointers implementing tamper-evident distributed ledger, where a blockchain may include a linked list of the blocks. In some embodiments, a block of the blockchain includes a Merkel tree and a corresponding Merkel root to provide node attribute(s) of the block. Subsequent blocks of the block may have node attributes that include cryptographic hashes based on the Merkel root of their respective proceeding blocks, which may be used to advertise or verify the history of a blockchain.

During cryptographic mining, digital assets having unique identifiers generated by mining activity may be associated with one or more values associated with an environmental impact. For example, some embodiments may store an indicator of a total amount of electrical energy used to generate the digital asset and the type of energy used to generate the digital asset, such as solar energy, natural-gas-generated energy, or the like. Alternatively, or in addition, some embodiments may store other environmental-cost-related indicators in association with a digital asset, such as a carbon footprint amount.

Figure 4:
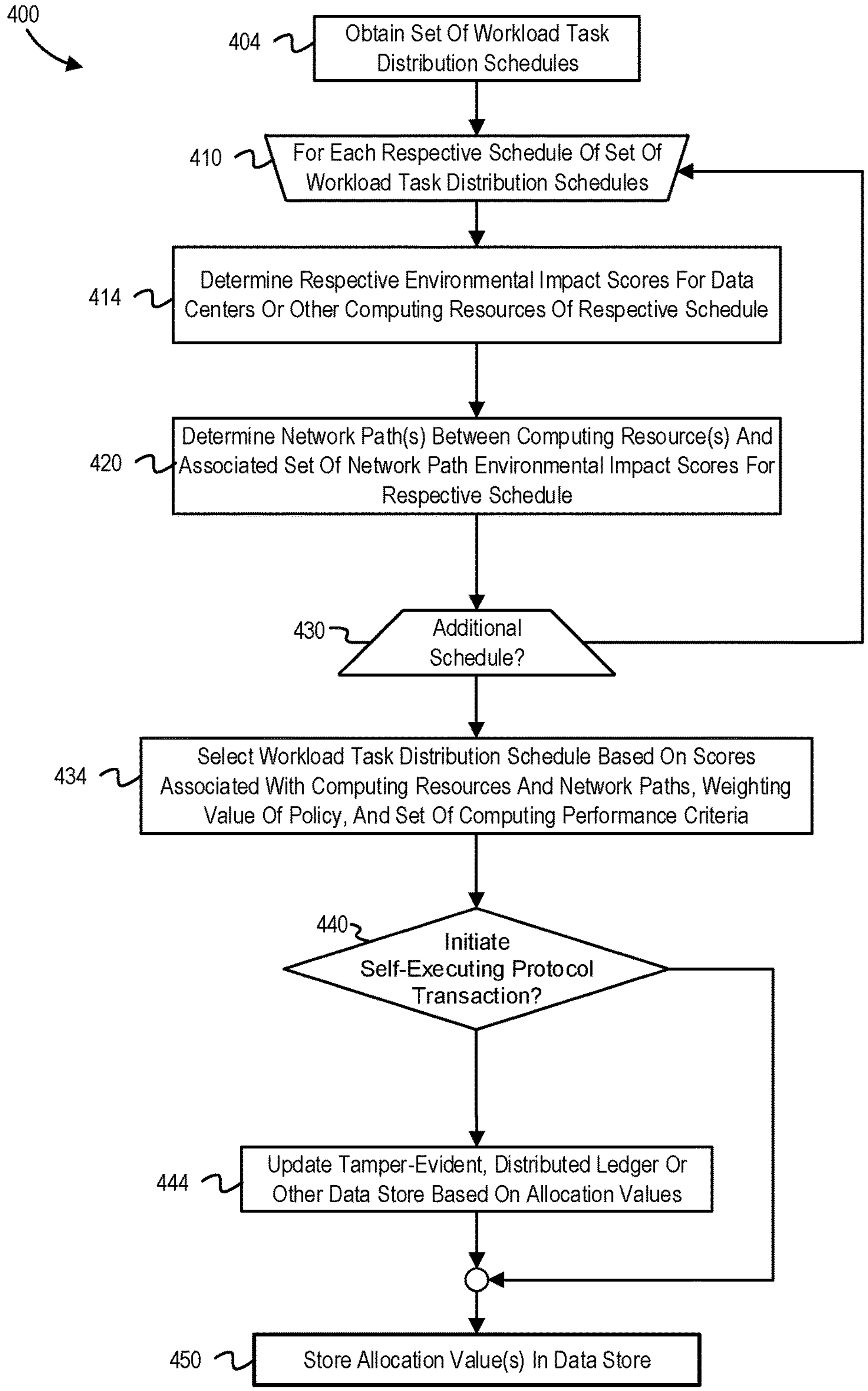
FIG. 4 illustrates a flowchart of a process for determining an environmental impact score associated with a network path and updating a tamper-evident, distributed ledger in accordance with some embodiments.

FIG. 4 illustrates a flowchart of a process for determining an environmental impact score associated with a network path and updating a tamper-evident, distributed ledger in accordance with some embodiments Operations of the process 400 may include obtaining a set of workload task distribution schedules, as indicated for block 404. Some embodiments may perform one or more operations described in the process 300 to obtain a set of workload distribution schedules. For example, some embodiments may generate a plurality of workload task distribution schedules based on a set of computing resources and a set of computing performance criteria, where each respective workload task distribution schedule is associated with a subset of computing resources.

As described further below, operations of the process 400 may include iteratively performing a set of operations for each respective schedule of the set of workload task distribution schedules, as indicated for block 410. The set of operations may include determining a respective computing performance score as indicated for block 414 and determining a set of network paths for the respective schedule as indicated for block 420.

Operations of the process 400 may include determining a set of respective environmental impact scores for a set of data centers or other computing resources of the respective schedule, as indicated for block 414. As described elsewhere in this disclosure, some embodiments may use one or more operations described for the process 300 to determine environmental impact scores of data centers or other computing resources. For example, the energy source of a data center or other computing resource may be identified as "nuclear" and used to determine an environmental impact score (e.g., such as setting the carbon emission amount to "0").

Operations of the process 400 may include determining a set of network paths between the set of computing resources and an associated set of network path environmental impact scores, as indicated for block 420. In some embodiments, obtaining a network path may include obtaining identifiers of a set of nodes representing a network path. For example, some embodiments may obtain a network path by obtaining a list of identifiers of a first, second, and third computing node, such as ["ExampleCo1 AS251237", "ExampleCo2 AS17811", "ExampleCo2 ASGGG1237"] that are used to communicate between a first and second node of the network path.

Some embodiments may use a routing table to store environmental impact scores associated with different network paths to network destinations. A routing table may include a plurality of network paths, where including a network path may include identifying a network identifier of the network path and the next hop of the network path. A routing table may also include values associated with the network paths, such as a quality-of-service value, a set of filtering criteria, a set of interface values, or the like. These environmental impact scores may be used as a type of network path score used to select network paths. As described elsewhere, network traffic may travel through a plurality of hops that is communicated across multiple layers that is made up of power-consuming devices such as routers, bridges, switches, hubs, or the like. As used in this disclosure, a node of a data network may include these power-consuming devices, data centers, mobile computing devices, or the like. In some embodiments, each respective network path of a set of routing tables may be associated with a respective carbon footprint amount or other respective environmental impact score associated with a node ("node score"), where the respective carbon footprint amount or other respective node score may also be stored in the routing data. Furthermore, some embodiments may update a routing table based on a determination a respective node that is associated with a respective energy source type experiences a change in the respective energy source type. For example, after a receiving a message indicating that the energy used to power a router of a first network path is switched from coal energy to solar energy, some embodiments may update a routing table to reduce the carbon footprint scores of the first network path.

Some embodiments may use telemetry values in combination with a set of obtained environmental impact scores to determine an environmental impact score associated with network paths listed in a routing table. For example, some embodiments may determine that a first network path uses a router and a switch located at a first location and a second location, respectively. Some embodiments may then use a set of telemetry values to determine an electrical energy use of the devices and an approximate proportion of power used by the data transport through the network path. Some embodiments may further determine types of power sources used to power the router and the switch, respectively, and retrieve a set of carbon generation rates (e.g., 0.91 pounds per kilowatt) based on the power sources. Some embodiments may then determine a carbon footprint score or another environmental impact score based on a product of the energy used to transport data and the carbon generation rates. For example, some embodiments may determine a carbon footprint score for a network path listed in a routing table based on a product of a data-transport-rate-to-power conversion rate equal to 0.1 watts per million bits per second and a carbon generation rates equal to 0.91 pounds per kilowatt.

Various routing protocols may be used to determine a data network path and populate a routing table. For example, some embodiments may use a process based on a border Gateway Protocol (BGP) path selection algorithm or a process based on an Open Shortest Path First (OSPF) path selection algorithm. Some embodiments may associate one or more network paths with an environmental impact score based on one or more environmental impact scores associated with the equipment used to execute the hops through a network path. For example, some embodiments may modify the BGP path selection algorithm by updating a sum used to select hops of a network path with a carbon footprint score associated with a carbon footprint cost associated with the hops. Some embodiments may then determine a total environmental impact for use as an environmental impact score of the network path based on a sum of the individual environmental impact score of the hops through the nodes of the network path. In some embodiments, a plurality of environmental impact scores of network paths may be stored in a routing table. As described elsewhere in this disclosure, some embodiments may use the stored plurality of environmental impact scores to compare the network path scores and select a network path indicated to have a minimum environmental impact (e.g., a least amount of carbon emitted). Some embodiments may perform this comparison in isolation, without regards to data center environmental impact scores or other scores. Alternatively, some embodiments may first add data center environmental impact scores other environmental impact scores before performing a comparison.

In some embodiments, operations of the process 400 may include determining whether there is an additional workload task distribution schedule to process, as indicated for block 430. As described above, operations of the process 400 may include iteratively performing operations described for block 414 or block 420 for each additional schedule to process. After each of the obtained or otherwise determined set of workload task distribution schedules have been processed using one or more operations described for blocks 414 and 420, some embodiments may proceed to operations described for block 434. Otherwise, operations of the process 400 may return to operations described for block 410.

Operations of the process 400 may include selecting a workload task distribution schedule based on scores associated with the set of computing resources and set of network paths, a corresponding set of weighting values of a policy, and a respective set of performance criteria, as indicated for block 434. In some embodiments, a total environmental impact score may be determined based on the first set of scores and a second set of scores. The first set of scores may be associated with combinations of data centers used to execute a set of workloads, and the second set of scores may be associated with a set of network paths used to communicate data between the data centers. Some embodiments may then select the workload task distribution schedule associated with a least environmental impact that still satisfies a set of performance criteria of a distributed application. For example, some embodiments may determine different workload task distribution schedules for a workload. Each schedule may identify a subset of data centers and may be associated with a combined environmental impact score for the subset of data centers. Some embodiments may then determine a plurality of network paths with a corresponding set of environmental impact scores associated with the network path determined from the nodes and routes of the network paths. Some embodiments may determine multiple sums, where each sum is a sum of a first score associated with a respective subset of data centers and a second score associated with a network path that connects data centers of the respective subset of data centers.

As described elsewhere in this disclosure, some embodiments may select a workload task distribution schedule from a set of workload task distribution schedules that has the least environmental impact. For example, using the operations described above, some embodiments may obtain a set of three workload task distribution schedules, each identifying a different subset of computing devices to execute a workload of an application. Some embodiments may then determine two different network paths for each subset of computing devices. Based on the described number of subsets of computing devices and network paths, some embodiments may determine a total of six different total environmental impact scores. Some embodiments may then select a first environmental impact score, where the first environmental impact score indicates a least amount of environmental impact relative to the other five environmental impact scores (e.g., such as by having the least value). If the first environmental impact score is associated a first workload task distribution schedule, some embodiments may then orchestrate computing device use and network traffic based on the first workload task distribution schedule.

In some embodiments, operations of the process 400 may include determining whether a self-executing protocol transaction is to be initiated, as indicated for block 440. Some embodiments may determine that a self-executed protocol transaction is to be initiated based on a determination that an environmental impact cost satisfies an impact threshold. For example, some embodiments may determine that a self-executing protocol transaction is to be executed based on a determination that a carbon footprint value exceeds a carbon footprint threshold. As described elsewhere in this disclosure, some embodiments may perform a set of database transactions recording an exchange between organizations representing a purchase of carbon footprint credits. Some embodiments may record these transactions in a tamper-evident, distributed ledger. If a determination is made that a self-executing protocol transaction is to be initiated, some embodiments may proceed to perform operations described for block 444. Otherwise, operations of the process 400 may proceed to operations described for block 450.

In some embodiments, operations of the process 400 may include updating a tamper-evident, distributed ledger or other data store based on the set of allocation values, as indicated for block 444. Some embodiments may perform an exchange between two organizations based on program instructions encoded in a self-executing protocol. For example, some embodiments may execute an exchange whereby a first organization assigns a carbon tax credit to modify a recorded carbon footprint score and a second organization receives a digital asset.

Some embodiments may search through a plurality of self-executing protocols based on a minimum value, such as a price per environmental impact unit. For example, some embodiments may search through a plurality of self-executed protocols based on a price per metric ton of emitted carbon. Some embodiments may select a self-executing protocol based on a cumulative value, such as a total price for an environmental impact amount. For example, some embodiments may predict that a total emitted carbon amount is equal to 500 metric tons and, in response, determine a total cost of purchasing 500 metric tons of carbon tax credits.

In some embodiments, the set of allocation values associated with the set of computing resources may be stored in a data store, as indicated for block 450. For example, after determining a set of allocation values used to select the computing resources and network paths used to execute a workflow of a distributed application, some embodiments may store the allocation values in a persistent data store. In some embodiments, the persistent data store may include memory used to store data for a tamper-evident, distributed ledger. For example, some embodiments may store a set of allocation values of a first and second data center and the network path of a routing table on a block of a blockchain hosted in a network of peer nodes in a peer-to-peer network.

Some embodiments may store other values on a tamper-evident, distributed ledger. For example, some embodiments may perform operations to add a new block to a blockchain stored on the tamper-evident, distributed ledger. Various operations or consensus models may be used to add a block to a blockchain, such as by performing operations associated with a proof-of-work blockchain mining model. For example, some embodiments may obtain a most recent block hash value stored on a peer-to-peer computing nodes and generate a plurality of unique hash values. Some value may determine a set of energy consumption values or environmental impact values by keeping track of energy usage while performing computing operations. Some embodiments may then associate the environmental impact values with the results of the computing operations, such as a block of a blockchain or another type of digital asset resulting from the computing operations. Some embodiments may generate a candidate value by randomly or pseudo-randomly generating nonce values and then performing a series of hashing operations to transform the nonce values to the candidate value. Some embodiments may determine whether any of the candidate values satisfy a set of criteria based on the most recent block of a blockchain, such as selecting a candidate value that is equal to or less than the most recent block value.

In response to a determination that the hashed value satisfies the set of criteria, some embodiments may add a new block to the blockchain and send a notification to other nodes of the peer-to-peer computing nodes indicating that the set of criteria has been satisfied and that a new block has been added. Some embodiments may keep track of energy usage while generating the candidate values or testing the candidate values against the most recent block value. Some embodiments may then store the energy usage value in association with the new block, such that a respective block of a blockchain include energy usage data indicating an amount of energy used to generate the respective block. Some embodiments may use the energy usage value to determine a carbon footprint amount by retrieving a set of carbon footprint rates associated with a set of energy source types used to power the set of data centers used to determine the digital asset and the store the carbon footprint amount in the block of the blockchain. Furthermore, while the above describes operations of a proof-of-work consensus model, some embodiments may store energy consumption values or environmental impact values on a blockchain generated using other consensus models, such as a proof of stake model, proof of capacity mode, or proof of space time consensus model. For example, some embodiments may add blocks to a blockchain use a proof of capacity or proof of space time consensus model by first allocating a set of disk space for a block and then advertising the allocation of the disk space to a tamper-evident, distributed ledger. In addition, some embodiments may then periodically or intermittently re-update the tamper-evident, distributed ledger to indicate that the disk space remains allocated.

Computer System

Figure 5:
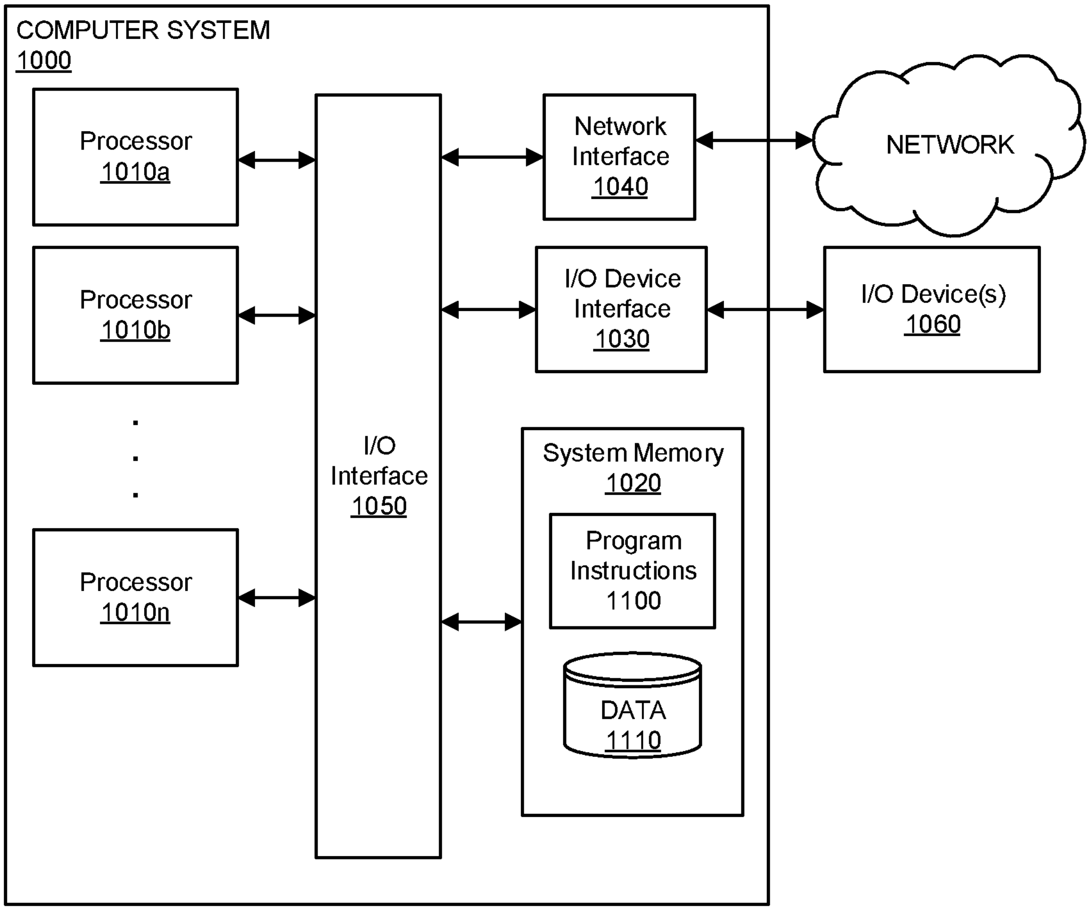
FIG. 5 illustrates an example computing system by which the present techniques may be implemented in some embodiments.

FIG. 5 shows an example computing system 1000 by which the present techniques may be implemented in accordance with some embodiments. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., a vision processing unit (VPU), a neuromorphic complementary metal—oxide—semiconductor (CMOS) chip, an FPGA (field programmable gate array), a PGA (programmable gate array), or an ASIC (application specific integrated circuit) such as a tensor processing unit (TPU). Computing system 1000 may include a plurality of computing devices (e.g., distributed computer systems) to implement various processing functions.

I/O device interface 1030 may provide an interface for connection of one or more I/O devices 1060 to computing system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computing system 1000 through a wired or wireless connection. I/O devices 1060 may be connected to computing system 1000 from a remote location. I/O devices 1060 located on remote computer system, for example, may be connected to computing system 1000 via a network and network interface 1040.

Network interface 1040 may include a network adapter that provides for connection of computing system 1000 to a network. Network interface may 1040 may facilitate data exchange between computing system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory, computer-readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010*a*-1010*n*, system memory 1020, network interface 1040, I/O devices 1060, or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1000 or multiple computing systems 1000 configured to host different portions or instances of embodiments. Multiple computing systems 1000 may provide for parallel or sequential processing/execution of one or more portions of the techniques described herein.

Those skilled in the art will appreciate that computing system 1000 is merely illustrative and is not intended to limit the scope of the techniques described herein. Computing system 1000 may include any combination of mobile computing devices or software that may perform or otherwise provide for the performance of the techniques described herein. For example, computing system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1000 may also be connected to other devices that are not illustrated, or may operate as a stand-alone system. In addition, the functionality provided by the illustrated components may, in some embodiments, be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method, comprising: obtaining, with a computing system, a workload of a distributed application; obtaining, with the computing system, a set of candidate computing resources; predicting, with the computing system, amounts of carbon emissions attributable to executing the workload on different members of the set of candidate computing resources; predicting, with the computing system, measures of computing performance in executing the workload of the different members of the set of candidate computing resources; computing, with the computing system, a set of scores based on the amounts of carbon emissions and the measures of computing performance; and orchestrating, with the computing system, the workload based on the set of scores.
2. The method of embodiment 1, wherein: the computing system executes an orchestration system that performs the orchestrating; orchestrating the workload based on the set of scores comprises: obtaining a threshold of an account record; determining a first combination of the set of candidate computing resources; determining a sum carbon emission amount based on a sum of the amounts of carbon emissions of the first combination of the set of candidate computing resources; determining whether the sum carbon emission amount satisfies the threshold; and in response to a determination that the sum carbon emission amount satisfies the threshold, orchestrating the workload; the orchestration system is configured to provide automated configuration, coordination and management of a computing network, computing devices, and services with which the distributed application is deployed; each member of the set of scores is based on both one of the amounts of carbon emissions and one of the measures of computing performance and different members of the set of scores correspond to different computing resources among the candidate computing resources; the measures of computing performance include latency in responses to application program interface requests to a plurality services of the distributed application executing on a plurality of virtual machines, containers, Lambda functions, or unikernels; and orchestrating the workload based on the set of scores comprises balancing between carbon emissions and computing performance to select which candidate computing resources will execute at least part of the workload.
3. The method of embodiment 1, where orchestrating the workload based on the set of scores comprises: determining, based on the amounts of carbon emissions, a first carbon emission amount of a first computing resource of the set of candidate computing resources; updating a score of the set of scores stored on a tamper-evident, distributed ledger encoding records of a plurality of previous values in a directed acyclic graph of cryptographic hash pointers based on the first carbon emission amount; and executing a portion of the workload using the first computing resource.
4. The method of embodiment 1, wherein predicting amounts of carbon emissions comprises: determining a first probability weight associated with a first carbon emission amount; determining a second probability weight associated with a second carbon emission amount; obtaining an energy consumption of a first candidate computing resource of the set of candidate computing resources; and determining the first carbon emission amount of the first candidate computing resource based on the first probability weight, the second probability weight, and the first carbon emission amount.
5. A tangible, non-transitory, machine-readable medium storing instructions that, when executed by one or more processors, effectuate operations comprising:
obtaining, with a computer system, a first plurality of scores of a plurality of data centers executing a plurality of workload tasks of a distributed application, wherein the distributed application is associated with a set of performance criteria, and wherein the first plurality of scores indicates environmental impacts of the plurality of data centers; obtaining, with the computer system, a set of telemetry values indicating a utilization of the plurality of data centers and a data network in communication with the plurality of data centers by the plurality of workload tasks; determining, with the computer system, a workload task distribution based on the set of performance criteria, wherein the workload task distribution allocates workload tasks of the distributed application to a subset of data centers of the plurality of data centers; determining, with the computer system, a subset of scores the first plurality of scores, wherein each respective score of the subset of scores is associated with a respective data center of the subset of data centers; determining, with the computer system, a path through the data network connecting a first data center of the subset of data centers with a second data center of the subset of data centers, wherein nodes of the path are associated with a second plurality of scores that indicate environmental impacts of the nodes of the path; determining, with the computer system, a sum of the subset of scores and the second plurality of scores; determining, with the computer system, whether the sum satisfies a set of selection criteria; and in response to the sum satisfying the set of selection criteria, orchestrating, with the computer system, a set of computing resources comprising the first data center and the second data center to execute the distributed application.

6. The medium of embodiment 5, wherein the set of performance criteria comprises at least one of a measure of central tendency of application response time, a count of application instances, or a request rate.

7. The medium of embodiment 5, wherein the first plurality of scores is correlated with a carbon footprint amount.

8. The medium of embodiment 5, the operations further comprising: determining that the distributed application is used to generate a digital asset assigned to a unique value stored on a tamper-evident, distributed ledger encoding records of a plurality of previous values in a directed acyclic graph of cryptographic hash pointers; and storing the sum in association with the digital asset on the tamper-evident, distributed ledger.

9. The medium of embodiment 5, wherein: the workload task distribution is a first workload task distribution; determining the first workload task distribution comprises determining a plurality of workload task distribution schedules; and the operations comprise selecting the first workload task distribution based on the set of performance criteria, wherein the first workload task distribution satisfies the set of performance criteria.

10. The medium of embodiment 5, wherein the plurality of scores is a first plurality of scores, wherein the path is a first network path, and wherein determining the first network path comprises: determining a plurality of network paths, wherein each respective path of the plurality of network paths connects the first data center with the second data center; retrieving a routing table comprising network paths to nodes of the data network and a second plurality of scores indicating carbon footprint amounts of transporting data through the network paths of the routing table, wherein each respective network path is associated with a respective carbon footprint amount; determining a first network path and as second network path, wherein the first network path is associated with a first network path score of the routing table, and wherein the second network path is associated with a second network path score of the routing table; and selecting the first network path based a comparison between the first network path score and the second network path score.

11. The medium of embodiment 10, the operations further comprising: for each respective node of the data network: obtaining a respective energy source type; generating a respective node score based on the respective energy source type; and updating a routing table based on the respective node score.

12. The medium of embodiment 5, wherein: the distributed application executing on the plurality of data centers provides data to a set of client computing devices; and the set of telemetry values comprises a first subset of telemetry values provided by the plurality of data centers and a second subset of telemetry values provided by the data network.

13. The medium of embodiment 5, wherein obtaining the first plurality of scores comprises: obtaining a plurality of geolocations of the plurality of data centers; sending, via an application program interface, a first set of web messages to a server, wherein the first set of web messages comprise the plurality of geolocations; obtaining a second set of web messages from the server; and determining the first plurality of scores based on the second set of web messages.

14. The medium of embodiment 5, the operations further comprising: determining whether a first score of the subset of scores satisfies a threshold; and in response to a determination that the first score satisfies the threshold, advertising an identifier of a selected data center associated with the first score on a network connecting the plurality of data centers.

15. The medium of embodiment 5, the operations further comprising: obtaining an update to a first score associated with the first data center; determining whether the updated first score satisfies a threshold; in response to a determination that the updated first score satisfies the threshold, selecting a third data center of the subset of data centers; and re-allocating the set of computing resources to comprise the third data center.

16. The medium of embodiment 15, wherein obtaining the update to the first score comprises: obtaining, via an application program interface, an indication that an energy source powering the first data center has changed from a first energy source type to a second energy source type; sending a query to a data store identifying the second energy source type receiving an updated value associated with the second energy source type in response to the query; and updating the first score associated with the first data center.

17. The medium of embodiment 5, the operations further comprising: allocating disk space of the first data center; updating a block of a tamper-evident, distributed ledger encoding records of a plurality of previous values in a directed acyclic graph of cryptographic hash pointers indicating that the disk space has been allocated; and periodically updating the tamper-evident, distributed ledger to indicate that the disk space has been allocated.

18. A method comprising: the operations of any one of embodiments 1-17.

What is claimed is:

1. A method, comprising:

obtaining, with a computing system, a workload of a distributed application;

obtaining, with the computing system, a set of candidate computing resources;

predicting, with the computing system, amounts of carbon emissions attributable to executing the workload on different members of the set of candidate computing resources;

predicting, with the computing system, measures of computing performance in executing the workload of the different members of on the set of candidate computing resources;

computing, with the computing system, a set of scores based on the amounts of carbon emissions and the measures of computing performance; and orchestrating, with the computing system, the workload based on the set of scores, wherein:

orchestrating the workload based on the set of scores comprises generating a workload-orchestration plan comprising a plurality of pending resource-orchestration actions for the set of candidate computing resources, the plurality of pending resource-orchestration actions comprises at least two of: moving at least part of the workload from a first candidate computing resource to a second candidate computing resource, changing an amount of resources allocated to a virtual machine, increasing a number of virtual machine instances, scaling down a first computing resource, or scaling up a second computing resource, predicting the amounts of carbon emissions comprises determining, for each pending resource-orchestration action of the plurality of pending resource-orchestration actions, a projected carbon-emission change based on a projected energy-usage change attributable to the pending resource-orchestration action, predicting the measures of computing performance comprises determining, for each pending resource-orchestration action of the plurality of pending resource-orchestration actions, a projected effect on one or more application-performance criteria based on telemetry values indicating utilization of the set of candidate computing resources, computing the set of scores comprises computing an optimization-plan score based on a summation of the projected carbon-emission changes of the plurality of pending resource-orchestration actions and the projected effects on the one or more application-performance criteria, and orchestrating the workload based on the set of scores comprises selecting at least one pending resource-orchestration action of the plurality of pending resource- orchestration actions based on the optimization-plan score and causing execution of the selected pending resource-orchestration action.

2. The method of claim 1, wherein:

the computing system executes an orchestration system that performs the orchestrating;

orchestrating the workload based on the set of scores comprises:

obtaining a threshold of an account record;

determining a first combination of the set of candidate computing resources;

determining a sum carbon emission amount based on a sum of the amounts of carbon emissions of the first combination of the set of candidate computing resources;

determining whether the sum carbon emission amount satisfies the threshold; and in response to a determination that the sum carbon emission amount satisfies the threshold, orchestrating the workload;

the orchestration system is configured to provide automated configuration, coordination and management of a computing network, computing devices, and services with which the distributed application is deployed;

the measures of computing performance include latency in responses to application program interface requests to a plurality of services of the distributed application executing on a plurality of virtual machines, containers, Lambda functions, or unikernels; and orchestrating the workload based on the set of scores comprises balancing between carbon emissions and computing performance to select which candidate computing resources will execute at least part of the workload.

3. The method of claim 1, wherein orchestrating the workload based on the set of scores comprises:

determining, based on the amounts of carbon emissions, a first carbon emission amount of a first computing resource of the set of candidate computing resources;

updating a score of the set of scores stored on a tamper-evident, distributed ledger encoding records of a plurality of previous values in a directed acyclic graph of cryptographic hash pointers based on the first carbon emission amount; and executing a portion of the workload using the first computing resource.

4. The method of claim 1, wherein predicting amounts of carbon emissions comprises:

determining a first probability weight associated with a first carbon emission amount;

determining a second probability weight associated with a second carbon emission amount;

obtaining an energy consumption of a first candidate computing resource of the set of candidate computing resources; and determining a carbon emission amount of the first candidate computing resource based on the first probability weight and the second probability weigh.

5. A tangible, non-transitory, machine-readable medium storing instructions that, when executed by one or more processors, effectuate operations comprising:

obtaining, with a computer system, a first plurality of scores of a plurality of data centers executing a plurality of workload tasks of a distributed application, wherein the distributed application is associated with a set of performance criteria, and wherein the first plurality of scores indicates environmental impacts of the plurality of data centers;

obtaining, with the computer system, a set of telemetry values indicating a utilization of the plurality of data centers and a data network in communication with the plurality of data centers by the plurality of workload tasks;

determining, with the computer system, a workload task distribution based on the set of performance criteria, wherein the workload task distribution allocates workload tasks of the distributed application to a subset of data centers of the plurality of data centers;

determining, with the computer system, a subset of scores among the first plurality of scores, wherein each respective score of the subset of scores is associated with a respective data center of the subset of data centers;

determining, with the computer system, a path through the data network connecting a first data center of the subset of data centers with a second data center of the subset of data centers, wherein nodes of the path are associated with a second plurality of scores that indicate environmental impacts of the nodes of the path;

determining, with the computer system, a sum of the subset of scores and the second plurality of scores;

determining, with the computer system, whether the sum satisfies a set of selection criteria; and in response to the sum satisfying the set of selection criteria, orchestrating, with the computer system, a set of computing resources comprising the first data center and the second data center to execute the distributed application.

6. The medium of claim 5, wherein the set of performance criteria comprises at least one of a measure of central tendency of application response time, a count of application instances, or a request rate.

7. The medium of claim 5, wherein the first plurality of scores is correlated with a respective carbon footprint amount.

8. The medium of claim 5, the operations further comprising:

determining that the distributed application is used to generate a digital asset assigned to a unique value stored on a tamper-evident, distributed ledger encoding records of a plurality of previous values in a directed acyclic graph of cryptographic hash pointers; and storing the sum in association with the digital asset on the tamper-evident, distributed ledger.

9. The medium of claim 5, wherein:

the workload task distribution is a first workload task distribution;

determining the first workload task distribution comprises determining a plurality of workload task distribution schedules; and the operations comprise selecting the first workload task distribution based on the set of performance criteria, wherein the first workload task distribution satisfies the set of performance criteria.

10. The medium of claim 5, wherein the path is a first network path, and wherein determining the first network path comprises:

determining a plurality of network paths, wherein each respective path of the plurality of network paths connects the first data center with the second data center;

retrieving a routing table comprising network paths to nodes of the data network and a second plurality of scores indicating carbon footprint amounts of transporting data through the network paths of the routing table, wherein each respective network path is associated with a respective carbon footprint amount;

determining a first network path and a second network path, wherein the first network path is associated with a first network path score of the routing table, and wherein the second network path is associated with a second network path score of the routing table; and selecting the first network path based on a comparison between the first network path score and the second network path score.

11. The medium of claim 10, the operations further comprising:

for each respective node represented in the routing table:

obtaining a respective energy source type;

generating a respective node score based on the respective energy source type; and updating the routing table based on the respective node score.

12. The medium of claim 5, wherein:

the distributed application executing on the plurality of data centers provides data to a set of client computing devices; and the set of telemetry values comprises a first subset of telemetry values provided by the plurality of data centers and a second subset of telemetry values provided by the data network.

13. The medium of claim 5, wherein obtaining the first plurality of scores comprises:

obtaining a plurality of geolocations of the plurality of data centers;

sending, via an application program interface, a first set of web messages to a server, wherein the first set of web messages comprises the plurality of geolocations;

obtaining a second set of web messages from the server; and determining the first plurality of scores based on the second set of web messages.

14. The medium of claim 5, the operations further comprising:

determining whether a first score of the subset of scores satisfies a threshold; and in response to a determination that the first score satisfies the threshold, advertising an identifier of a selected data center associated with the first score on a network connecting the plurality of data centers.

15. The medium of claim 5, the operations further comprising:

obtaining an update to a first score associated with the first data center;

determining whether the updated first score satisfies a threshold;

in response to a determination that the updated first score satisfies the threshold, selecting a third data center of the subset of data centers; and re-allocating the set of computing resources to comprise the third data center.

16. The medium of claim 15, wherein obtaining the update to the first score comprises:

obtaining, via an application program interface, an indication that an energy source powering the first data center has changed from a first energy source type to a second energy source type;

sending a query to a data store identifying the second energy source type;

receiving an updated value associated with the second energy source type in response to the query; and updating the first score associated with the first data center.

17. The medium of claim 5, the operations further comprising:

allocating disk space of the first data center;

updating a block of a tamper-evident, distributed ledger encoding records of a plurality of previous values in a directed acyclic graph of cryptographic hash pointers indicating that the disk space has been allocated; and periodically updating the tamper-evident, distributed ledger to indicate that the disk space remains allocated.

18. The medium of claim 5, wherein determining the workload task distribution comprises steps for determining the workload task distribution.

19. The medium of claim 5, wherein determining the path through the data network comprises steps for determining the path through the data network.

20. A method comprising:

obtaining, with a computer system, a first plurality of scores of a plurality of data centers executing a plurality of workload tasks of a distributed application, wherein the distributed application is associated with a set of performance criteria, and wherein the first plurality of scores indicates environmental impacts of the plurality of data centers;

obtaining, with the computer system, a set of telemetry values indicating a utilization of the plurality of data centers and a data network in communication with the plurality of data centers by the plurality of workload tasks;

determining, with the computer system, a workload task distribution based on the set of performance criteria, wherein the workload task distribution associates different tasks of the distributed application to a subset of data centers of the plurality of data centers;

determining, with the computer system, a subset of scores among the first plurality of scores, wherein each respective score of the subset of scores is associated with a respective data center of the subset of data centers;

determining, with the computer system, a path through the data network connecting a first data center of the subset of data centers with a second data center of the subset of data centers, wherein nodes of the path are associated with a second plurality of scores that indicate environmental impacts of the nodes of the path;

determining, with the computer system, a sum of the subset of scores and the second plurality of scores;

determining, with the computer system, whether the sum satisfies a set of selection criteria; and in response to the sum satisfying the set of selection criteria, orchestrating, with the computer system, a set of computing resources comprising the first data center and the second data center to execute the distributed application.

* * * * *